United States Patent [19]
Richards

[11] Patent Number: 4,868,764
[45] Date of Patent: Sep. 19, 1989

[54] IMAGE ENCODING AND DECODING METHOD AND APPARATUS

[75] Inventor: Norman D. Richards, Horsham, England

[73] Assignee: U.S. Philips Corporation, New York, N.Y.

[21] Appl. No.: 35,104

[22] Filed: Apr. 6, 1987

[30] Foreign Application Priority Data

Apr. 14, 1986 [GB] United Kingdom ................. 8609078

[51] Int. Cl.⁴ .............................................. H04N 9/78
[52] U.S. Cl. ..................................... 364/518; 358/30; 358/31; 382/56
[58] Field of Search ........ 364/518, 521, 900 MS File; 358/30, 31; 340/802–804; 382/56

[56] References Cited

U.S. PATENT DOCUMENTS

| | | | |
|---|---|---|---|
| 3,035,121 | 5/1962 | Schreiber | 358/135 |
| 4,158,837 | 6/1979 | Zahorsky | 340/804 X |
| 4,503,454 | 3/1975 | Lewis, Jr. | 358/30 |
| 4,554,670 | 11/1985 | Aiko et al. | 358/135 |
| 4,597,005 | 6/1986 | Baleshta et al. | 358/12 |
| 4,613,894 | 9/1986 | Catros et al. | 358/135 |
| 4,628,344 | 12/1986 | Glenn | 358/12 |
| 4,665,436 | 5/1987 | Osborne et al. | 358/135 |
| 4,727,497 | 2/1988 | Peters et al. | 340/804 X |
| 4,740,832 | 4/1988 | Sprague et al. | 358/13 |
| 4,743,960 | 5/1988 | Duvic et al. | 358/13 |
| 4,758,831 | 7/1988 | Kasahara et al. | 340/804 X |

OTHER PUBLICATIONS

"Philips Technical Review", vol. 40, 1982, No. 6, The entire volume.
Burt, Peter J. et al., "The Laplacian Pyramid as a Compact Image Code", Apr. 19, 1983, IEEE Transactions on Communication, vol. COM-31, No. 4, pp. 532–540.

*Primary Examiner*—Gary V. Harkcom
*Assistant Examiner*—H. R. Herndon
*Attorney, Agent, or Firm*—Thomas A. Briody; Jack E. Haken; Jack D. Slobod

[57] ABSTRACT

Pixel information representing an image for display is encoded using data compression into display data which can be stored on a compact disc. The data compression consists in obtaining the pixel information as a first matrix of high resolution pixel values, subtracting from this first matrix a second matrix composed of lower resolution pixel values, produced by low pass filtering the first matrix, to produce a third matrix of difference values, decimation filtering the second matrix to produce a fourth matrix of less density lower resolution pixel values and encoding the third and fourth matrices. The complementary decoding to obtain the original data consists in restituting the second matrix by interpolation filtering the coded fourth matrix, and combining the restituted second matrix with decoded third matrix. The coding of the third matrix takes into account rate of change pixel value information obtained by delta coding the fourth matrix and the decoding of the third matrix takes into account equivalent rate of change pixel information available at the interpolation filtering.

28 Claims, 3 Drawing Sheets

IMAGE ENCODING AND DECODING METHOD AND APPARATUS

BACKGROUND OF THE INVENTION

This invention relates to image display and more particularly to a method of image encoding by which pixel information for an image is encoded into digital data which can be recorded on a suitable storage medium. The invention also relates to a method of decoding by which such digital data is decoded to restitute the original pixel information. The invention further relates to arrangements for carrying out these encoding and decoding methods and to data display apparatus embodying such a decoding arrangement.

In a typical electronic image display apparatus, an image which is displayed on the screen of a CRT (cathode ray tube) or other display device is composed of discrete pixels each of which is represented by a respective digital code which defines a pixel in terms of chrominance and luminance pixel component values. Each of these digital codes is stored in a display memory at a location corresponding to the position of the pixel which it represents in the displayed image. The display memory is addressed periodically in synchronism with the operation of the display device to read out the digital codes which are used to produce video signals for driving the display device. The display produced by electronic image display apparatus of the above type is termed a bit-map display and has, for example, a resolution of 360×280 pixels. The apparatus can include a background memory in which is stored the pixel information for a large number of images. When a displayed image is to be replaced by a new image, the pixel information for the new image has to be made available in the display memory as the respective digital codes which represent the discrete pixel values for the new image. The pixel information can be stored in the background memory as the actual respective digital codes which represent the discrete pixel values, so that the digital codes for the new image can be read out from the background memory and written directly into the display memory in place of the digital codes for the previously displayed image.

The time taken for this read/write operation in respect of the digital codes for the new image depends *inter alia* upon the operating speed (i.e. the speed of data access) of the background memory. When the background memory is a mass memory, such as an optical record carrier (i.e. a compact disc) in its role as a read only memory (CD ROM), its operating speed may be too low for certain applications. In particular, it has been determined empirically that a user of image display apparatus of the above type will tolerate a delay of only about one second for replacing a displayed image by a new image. If the delay is significantly longer, then use of the apparatus becomes aesthetically unacceptable. As a consequence, the amount of pixel information that can be transferred from the background memory to the display memory to change the image being displayed becomes limited.

It has been found that such a limitation poses a problem in respect of enhanced resolution displays which require a large amount of pixel information. A CD ROM can readily provide the storage capacity which is necessary, but accessing this pixel information sufficiently quickly has proven to be difficult. As an example, for a normal resolution image display using a 360×280 pixel matrix, as aforesaid, the time taken to load digital codes representing discrete pixel values from a CD ROM into a display memory is thought to be on the margin of user acceptability. However, for an enhanced resolution image display using a 720×560 pixel matrix, (i.e. having a quadruple number of pixels), which is contemplated, the loading of digital codes representing discrete pixel values will take four times longer, which is unacceptable.

SUMMARY OF THE INVENTION

It is an object of the present invention to provide a more efficient form of encoding for at least one pixel component value of a plurality of pixels to reduce the amount of digital data that is required to be stored to provide enhanced resolution image displays.

According to one aspect of the invention, a method of image encoding by which pixel information for at least one pixel component value of a plurality of pixels forming an image is encoded into digital data which can be recorded on a suitable storage medium, comprises the steps of:

(a) obtaining said pixel information as a first matrix of $m \times n$ pixel component values, where $m$ and $n$ are integers, (b) low-pass filtering these pixel component values of the first matrix to produce a second matrix of $m \times n$ pixel component values which are in respect of a reduced resolution image compared with the pixel component values of the first matrix, (c) subtracting the second matrix from the first matrix pixel-by-pixel to produce a third matrix of $m \times n$ difference values, which have reduced pixel-to-pixel correlation compared with the pixel component values of the first matrix, (d) encoding said third matrix of difference values into a first set of digital data for storage on a storage medium, (e) decimation filtering said second matrix of pixel component values to produce a fourth matrix of $m/a \times n/b$ pixel component values of reduced density, where $a$ and $b$ are factors of $m$ and $n$, respectively, and (f) forming said fourth matrix of pixel component values, with or without subsequent encoding, into a second set of digital data for storage on a storage medium.

According to another aspect of the invention, a method of decoding the digital data obtained by the above encoding method, to restitute the original pixel information, comprises the steps of:

(g) decoding the first set of digital data representing the difference values to reconstitute the third matrix of difference values, (h) decoding, if necessary, the second set of digital data representing the pixel component values of reduced density to reconstitute the fourth matrix of pixel component values, (i) interpolation filtering said fourth matrix of pixel component values to restitute said second matrix of pixel component values, and (j) combining pixel-by-pixel the reconstituted third matrix and the restituted second matrix to restitute said first matrix, the pixel component values of which represent the original pixel information.

The encoding method according to the above steps (a) to (f) can include the further step (k) of recording the digital data produced by steps (d) and (f) onto a storage medium. The decoding method according to the above steps (g) to (j) can include the further step (l) of reading the digital data required by steps (g) and (h) from the storage medium.

In carrying out the encoding method, the low-pass filtering of the pixel component values of the first matrix in step (b), and the decimation filtering of the pixel component values of the second matrix in step (e) can both be by a factor of two both horizontally and vertically. This enables the reconstituted fourth matrix of pixel component values, as produced by step (h) of the decoding method to be used directly in respect of pixel information for a normal resolution display.

On first considering the invention, it might appear that the proposed encoding method has no data compression advantage (and thus does not save on storage capacity and therefore on read-out time) because the difference data produced by step (c) is no less dense than the original unprocessed data which is dealt with by step (a). However, this is not so and this interpretation neglects the statistics of real pictures and the properties of the human eye, both of which are used to advantage in predictive encoding, of which the encoding method of the invention is a special case. For all parts of an image, from which the pixel information is obtained, which are lacking in fine detail, the second matrix of pixel component values produced by the low-pass filtering will act as an excellant predictor. Thus, for large areas of the image the difference values will be so small as to be capable of being approximated to be zero without visible error. In areas of fine detail the difference values will be greater, but in these areas one can exploit the fact that the eye is much less sensitive in the vicinity of edges or fine detail so that larger difference values can be quantized coarsely, possibly to as little as three values.

Therefore, the encoding method according to the invention can include a further step (m) in which the encoding of the difference values into the first set of digital data, as dealt with by step (d), consists in quantizing these difference values into a smaller number of quantizing values, including zero, and encoding the quantized values statistically either by a respective multi-bit code, or as a run length code for zero difference values.

Further data compression can be realised by exploiting a further compression step for encoding the fourth matrix of pixel component values into the second set of digital data for storage as dealt with by step (f). This further compression step is also based on the fact that natural images have a high spatial correlation and, typically, graceful boundary transitions. This means that delta coding rather than absolute coding for a finite bandwidth can give a significant improvement in compression whilst maintaining picture quality.

Therefore, the encoding method according to the invention can include a still further step (n) in which the encoding of the pixel component values of the fourth matrix into the second set of digital data includes delta coding these pixel component values.

It will of course be apparent that when the encoding method employs these further steps (m) and/or (n), the decoding method will include complementary decoding steps for statistical and/or delta decoding.

An encoding arrangement according to the invention comprises:

means for obtaining pixel information for at least one pixel component value of a plurality of pixels forming an image as a first matrix of $m \times n$ pixel component values, where $m$ and $n$ are integers, means for low-pass filtering these pixel component values of the first matrix to produce a second matrix of $m \times n$ pixel component values, which are in respect of a reduced resolution image compared with the pixel component values of the first matrix, means for subtracting the second matrix from the first matrix pixel-by-pixel to produce a third matrix of $m \times n$ difference values, which have reduced pixel-to-pixel correlation compared with the pixel component values of the first matrix, means for encoding said third matrix of difference values into a first set of digital data for storage on a storage medium, means for decimation filtering said second matrix of pixel component values to produce a fourth matrix of $m/a \times n/b$ pixel component values of reduced density, where $a$ and $b$ are factors of $m$ and $n$, respectively, and means for forming said fourth matrix of pixel component values into a second set of digital data, with or without subsequent encoding, for storage on a storage medium.

A decoding arrangement according to the invention comprises:

means for decoding the first set of digital data representing the difference values, as produced by said encoding arrangement, to reconstitute the third matrix of difference values, means for decoding, if necessary, the second set of digital data representing the pixel component values of reduced density, as produced by said encoding arrangement, to reconstitute the fourth matrix of component pixel values, means for interpolation filtering said fourth matrix of pixel component values to restitute said second matrix of pixel component values, and means for combining pixel-by-pixel the reconstituted third matrix and the restituted second matrix to restitute said first matrix, the pixel component values of which represent the original pixel information.

The encoding arrangement can include further means for recording the resultant digital data onto a storage medium. The decoding arrangement can include further means for reading said digital data from the storage medium.

In the encoding arrangement, the means for low-pass filtering the pixel component values of the first matrix and the means for decimation filtering the pixel component values of the second matrix can both effect filtering by a factor of two both horizontally and vertically.

The encoding arrangement can include further means by which the encoding of the difference values into digital data consists in quantizing these difference values into a smaller number of quantizing values, including zero, and encoding the quantized values statistically either by a respective multi-bit code, or as a run length code for zero difference values.

The encoding arrangement can include a still further means by which the encoding of the pixel component values of the fourth matrix into digital data includes delta coding these pixel component values.

The decoding arrangement would then include complementary decoding means for statistical and/or delta decoding.

BRIEF DESCRIPTION OF THE DRAWINGS

In order that the invention may be more fully understood reference will now be made by way of example to the accompanying drawings, of which.

DETAILED DESCRIPTION OF THE INVENTION

Figure 1:
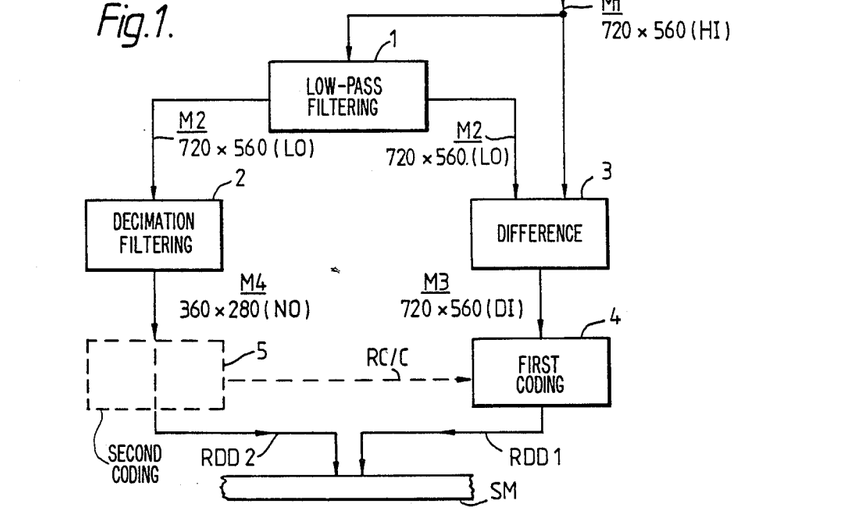
FIG. 1 represents diagrammatically an encoding method according to the invention.

Referring to the drawings, the representative diagram in FIG. 1, of the encoding method according to the invention, shows a low-pass filtering step 1, a decimation filtering step 2, a difference step 3, a first coding step 4 and, optionally, a second coding step 5. Pixel information for at least one component value of a plurality of pixels representing an image is applied to the low-pass filtering step 1 and also to the difference step 3. This pixel information is assumed by way of illustrative example to comprise a first matrix M1 of $720 \times 560$ pixel component values (HI). This pixel information is in respect of an enhanced resolution display which would be better than both standard 625 line camera resolution and studio quality and would require a high definition television screen for displaying the image concerned at full resolution.

The low-pass filtering step 1 effects low pass filtering to produce a second matrix M2 of $720 \times 560$ pixel component values (LO) which are in respect of a reduced resolution image compared with the pixel component values of the first matrix M1. The difference step 3 subtracts the second matrix M2 from the first matrix M1, pixel-by-pixel, to produce a third matrix M3 of $720 \times 560$ difference values (DI) which are quantized and statistically coded by the first coding step 4 into a first set of resultant digital data RDD1. The decimation filtering step 2 takes every second pixel component value of the second matrix M2, both horizontally and vertically, to produce a fourth matrix M4 of $360 \times 280$ pixel component values (NO) of reduced pixel density. The pixel information represented by this fourth matrix M4 is in respect of a normal resolution display. The second coding step 5, when provided, codes the pixel component values of the fourth matrix M4 into a second set of resultant digital data RDD2. Otherwise, the pixel component values of the fourth matrix M4 form the second set of resultant digital data RDD2 directly. These pixel component values, and also those of the matrices M1 and M2, and the difference values of the matrix M3, can be conventional pulse code modulated (PCM) data. The two sets of digital data RDD1 and RDD2 are available for storage on a suitable storage medium SM.

Figure 2:
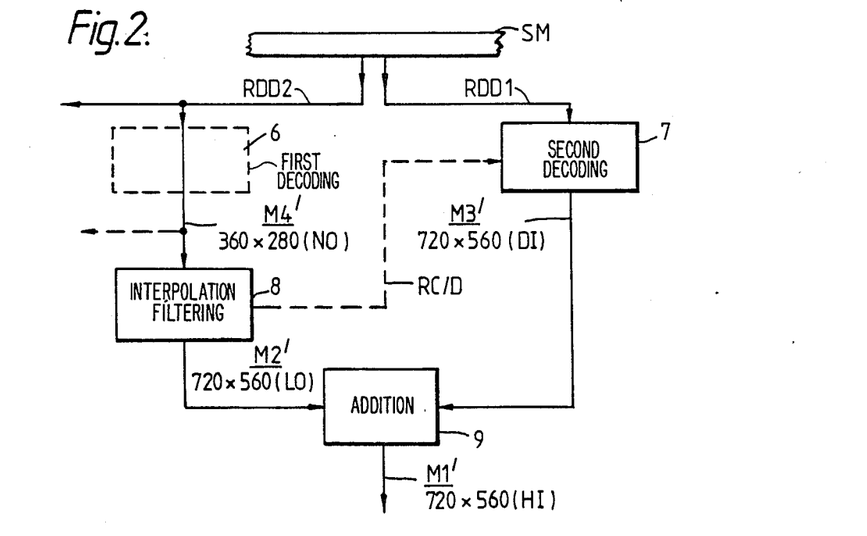
FIG. 2 represents diagrammatically a decoding method according to the invention.

The representative diagram in FIG. 2, of a decoding method according to the invention, shows a first decoding step 6 (the inclusion of which is conditional on the inclusion of the coding step 5 in the encoding method of FIG. 1), a second decoding step 7, an interpolation filtering step 8, and a combining or addition step 9.

The first set of digital data RDD1 as read out from the storage medium SM, is applied to the decoding step 7 which produces a restituted matrix M3' of $720 \times 560$ difference values (DI). The second set of digital data RDD2 as read from the storage medium SM, is applied to the interpolation filtering step 8 (either directly or via the decoding step 6) as the reconstituted fourth matrix M4', of $360 \times 280$ pixel component values (NO). The interpolation filtering step 8 produces a restituted second matrix M2' of $720 \times 560$ pixel component values (LO). The two restituted matrices M2' and M3' are applied to the combining or addition step 9 which produces a restituted first matrix M1' of $720 \times 560$ pixel component values (HI). This restituted first matrix M1' constitutes resultant pixel information which can be used in respect of a high resolution display of the original image. The reconstituted fourth matrix M4' can be used in respect of a normal resolution display of the original image.

In the encoding method represented in FIG. 1, the first coding step 4 can effect its quantizing and statistical coding on the basis of the criteria discussed earlier. When only a few (e.g. 3) quantizing values are used for the difference values in the matrix M3, the complementary decoding step 7 in the decoding method represented in FIG. 2 should distinguish between encoded values which are for steep transitions and those which are for gentler transitions if the image is to be reproduced accurately. An approximation of this distinction can be made by selectively including in the code for a difference value at a steep transition a constant weighting factor which will result in the decoded value being "stretched" compared with the decoded value obtained from an identical code, but without the weighting factor, which is used for a lesser difference value because of the quantization approximation.

In accordance with a subsidiary feature of the present invention, the presence of the second coding step 5 in the encoding method and the presence of the interpolation filtering step 8 in the decoding method is used with advantage to provide a more accurate restitution of the difference values. The coding step 5 produces delta coding and can therefore provide information as to the rate of change of the pixel component values of the matrix M4. As indicated by the dotted line RC/C in FIG. 1, this rate of change information is made available in the coding step 4 to enable a range of weighting factor values, as determined by the rate of change information, to be included with the coding of the difference values. In the decoding method, the interpolation filtering step 8 has equivalent rate of change information in the vicinity of each pixel component value being dealt with for the interpolation process and, as indicated by the dotted line RC/D in FIG. 2, this equivalent rate of change information is made available in the decoding step 7 to take account of the variable weighting factors.

Figure 3:
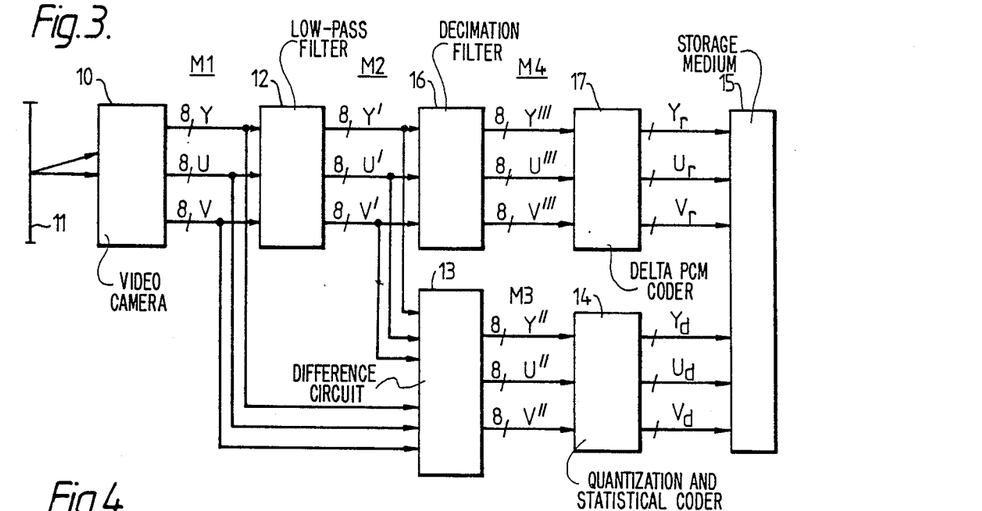
FIG. 3 shows diagrammatically an encoding arrangement using the encoding method of FIG. 1.

The encoding arrangement shown in FIG. 3 comprises a video camera 10 for producing image samples of a scene 11. The camera 10 produces the image samples as pixel information in a matrix M1 of $720 \times 560$ discrete pixel values. Each of these pixel values is in three component values represented by $3 \times 8$-bit PCM codes using YUV coding, where Y is the luminance component of a pixel and U and V are the two chrominance components. The matrix M1 (and also each of the other matrices in the arrangements of FIGS. 3 and 4) is therefore made up of three discrete sub-matrices one in respect of each of the pixel component values Y, U and V. This coding gives uncompressed natural pictures, 8 bits in depth for 256 colors, so that with 3×8 bits per pixel approximately 325 K.bit storage capacity would be required for a full-screen non-interleaved picture (650 K-bit would be required for an interlaced picture). The encoding arrangement achieves data compression which results in a considerable saving on this storage capacity, without any serious degrading of picture quality.

The YUV signal codes are applied to a low-pass filter 12 which filters these signal codes. The result is lower resolution pixel information in a matrix M2 of 720×560 discrete pixel values which are still represented by 3×8-bit PCM codes using YUV coding.

The Y'U'V' signal codes from the filter 12 are applied to a difference circuit 13. The difference circuit 13 also has applied to it the YUV signal codes from the camera 10 and is operable to subtract pixel-by-pixel the pixel values in the matrix M2 from the pixel values in the matrix M1. The result is a matrix M3 of 720×560 pixel difference values which are still represented by 3×8-bit PCM codes using YUV coding. The Y"U"V" signal codes from the difference circuit 13 are applied to a quantization and statistical coder 14. For the reasons given earlier in the specification, the pixel difference values in the matrix M3 are quantized into a small number of quantizing values, including zero, and the resulting quantized values are statistically coded either by a respective multi-bit code, or as a run length code for zero difference values. The resulting signal codes Yd, Ud, Vd constitute a first set of digital data which is stored on a storage medium 15.

The Y'U'V' signals codes from the filter 12 are also applied to a decimation filter 16 which is operable to filter out every second pixel value of the matrix M2 both horizontally and vertically to produce low resolution pixel information in a matrix M4 of 360×280 pixel values which are still represented by 3×8-bit PCM codes using YUV coding. The Y'''U'''V''' signals codes from the filter 16 are applied to a delta PCM (DPCM) coder 17.

The resulting signal codes Yr, Ur, Vr constitute a second set of digital data which is stored on the storage medium 15. The storage medium 15 is suitably an optical record carrier (i.e. a compact disc) which serves as a read-only memory to provide permanent storage of the digital data. The digital data would be reformatted (by suitable reformatting means not shown) prior to storage to make it compatible with the storage requirements for compact discs. This reformatting is known in the art and can involve block-type and/or convolution-type coding, using e.g. Reed/Solomon codes, to implement error detection and correction of the stored digital data. GB Application 8507248 gives an example of such coding techniques.

Figure 4:
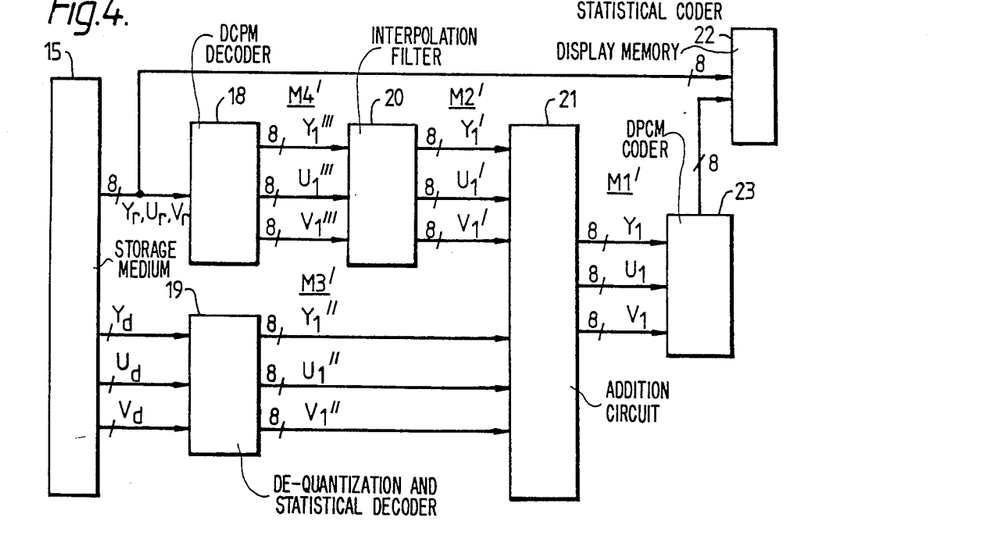
FIG. 4 shows diagrammatically a decoding arrangement using the decoding method of FIG. 2.

The decoding arrangement shown in FIG. 4 comprises two decoders 18 and 19 for receiving from the storage medium 15, in respect of an image to be displayed, a respective one of two sets of digital data (following de-reformatting of this digital data). The decoder 18 is a DCPM decoder and receives the set of digital data representing the resultant YrUrVr signal codes as produced by the coder 17 of the encoding arrangement. The output from the decoder 18 is the reconstituted matrix M4' of 360×280 pixel values as represented by the $Y_1'''$, $U_1'''$, $V_1'''$, signal codes. These signal codes are applied to an interpolation filter 20 which is operable to produce a restituted matrix M2' of 720×560 pixel values as represented by the $Y_1'$, $U_1'$, $V_1'$, signal codes. These latter signal codes are applied to an addition circuit 21.

The decoder 19 is a de-quantization and statistical decoder and receives the set of digital data Yd, Ud, Vd representing the resultant difference coding as produced by the coder 14 of the encoding arrangement. The output from the decoder 19 is the restituted matrix M3' of pixel difference values as represented by $Y_1''$, $U_1''$, $V_1''$, signal codes. These signal codes are also applied to the addition circuit 21, the resulting output from which is the restituted matrix M1' of 720×560 pixel values as represented by the $Y_1$, $U_1$, $V_1$, signal codes.

There is also shown in FIG. 4 a display memory 22 of a data display apparatus in which the decoding arrangement is assumed to be embodied. This display memory 22 requires the digital codes which represent the pixels of an image to be displayed to be in DPCM form. Accordingly, the $Y_1$, $U_1$, $V_1$, signal codes at the output of the addition circuit 21 are DPCM coded in a coder 23 and the resultant DPCM codes are written into the display memory 22 as the pixel information for a high resolution display of 720×560 pixels. DPCM codes for a normal resolution display of 360×280 pixels are directly available from the storage medium 15 for writing into the display memory 22, that is the set of digital data representing the resultant YrUrVr signal codes.

The article "The Laplacian Pyramid as a Compact Image Code", IEEE Transactions on Communications, Vol. COM-31, No. 4, Apr. 1983, provides a theoretical background to the image encoding/decoding methods of the present invention.

The publication "Philips Technical Review", Volume 40, 1982, No. 6, describes four articles on compact discs.

In the encoding arrangement of FIG. 3 and the decoding arrangement of FIG. 4, it has been assumed that pixel component values Y, U and V have been encoded and decoded identically. However, because the chrominance components U and V have far less relevance than the luminance component Y in defining picture content, these chrominance components U and V can, in practice, be sampled at half the sampling rate that the luminance component Y is sampled. As a consequence, the matrices for the chrominance components U and V would have half the horizontal resolution compared with the matrices for the luminance component Y. As another alternative, the chrominance components U and V can be stored directly (after reformatting) on the storage medium, with only delta coding if required, and only the luminance component Y is encoded as a combination of a matrix of low resolution Y values and a matrix of values representing the difference between the signal Y values and the low resolution Y values.

Figure 5:
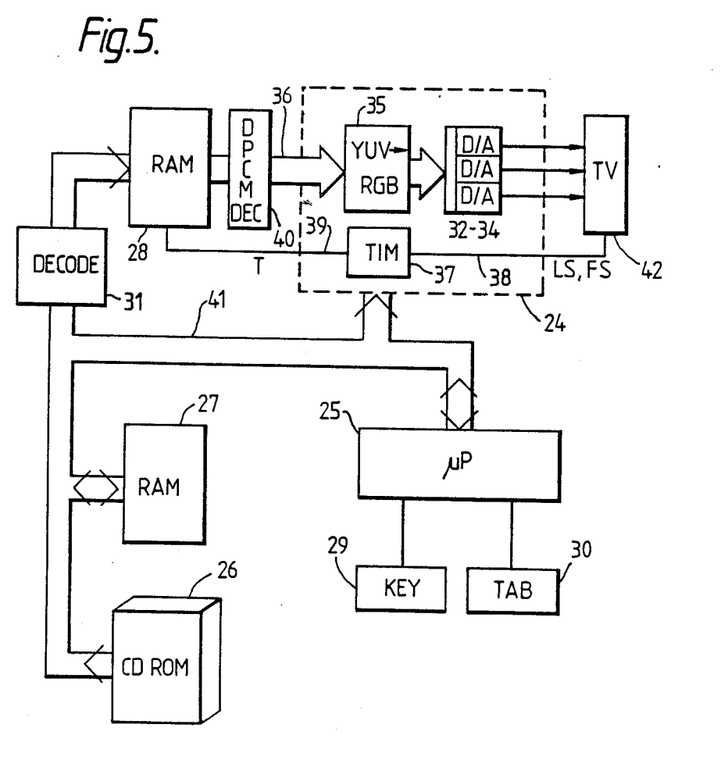
FIG. 5 shows diagrammatically an image display apparatus in which the decoding arrangement of FIG. 4 can be embodied.

The image display apparatus shown in FIG. 5 comprises a display device 42, a display generator 24, a processor 25, a mass memory device 26, a program memory 27, a display memory 28, user interface apparatus 29 and 30, and a decode device 31 which includes a decoding arrangement of the form shown in FIG. 4. The display device 42 is suitably a color television monitor which is connected to receive R,G,B, video signals from the display generator 24. These R,G,B, video signals are produced in the display generator 24 by three digital-to-analog converters 32, 33 and 34, respectively. The display generator 24 also includes a YUV-RGB matrix converter 25 which is responsive to decoded digital data representing YUV values and received from the display memory 28 over a bus 36 to produce digital signals representing the RGB values for driving the converters 32, 33 and 34. A display timer 37 in the display generator 24 provides line and field synchronisation signals LS and FS for the television monitor 23 over a connection 38. The timer 37 also provides over a connection 39 timing signals T for controlling the read-out of digital data from the display memory 28.

The display memory 28 is a random-access memory which has a capacity for storing in DPCM form the digital data for at least one display image. A PDCM decoder 40 decodes the digital data read out from the display memory 28 prior to its application to the display generator 24. A combined address/data bus 41 interconnects the display generator 24 and the display memory 28 with the processor 25. The program memory 27, which is also at least partially a random-access memory, is also connected to the address/data bus 41. The program memory 27 contains permanent program data for controlling the "house-keeping" operations of the processor 25. The user interface apparatus comprises a keyboard data entry device 29 and a graphics tablet 30. The processor 25 can be a commercially available microprocessor, for instance the Signetics S68000 $\mu$P.

The mass memory device 26 is a compact disc device and is also connected to the address/data bus 41. Digital data which is read out from the device 26 under the control of the processor 25 is de-reformatted, decoded, and then recoded into DPCM form by the code device 31, and then written into the display memory 28.

The encoding method according to the invention may be repeated to obtain one or more extra levels of data compression, thereby further reducing the amount of data to be stored for an image and thus further reducing the loading time required to read out the data from the storage medium and write it into the display memory.

From reading the present disclosure, other modifications will be apparent to persons skilled in the art. Such modifications may involve other features which are already known *per se* and which may be used instead of or in addition to features already described herein. Although claims have been formulated in this application to particular combinations of features, it should be understood that the scope of the disclosure of the present application also includes any novel feature or any novel combination of features disclosed herein either explicitly or implicitly or any generalisation or modification thereof which would be obvious to persons skilled in the art, whether or not it relates to the same invention as presently claimed in any claim and whether or not it mitigates any or all of the same technical problems as does the present invention. The applications hereby reserve the right to formulate new claims to such features and/or combinations of such features during the prosecution of the present application or of any further application derived therefrom.

I claim:

1. A method of image encoding by which pixel information for at least one pixel component value of a plurality of pixels forming an image is encoded into signal data which can be recorded on a suitable storage medium, comprising the steps of:
   (a) obtaining said pixel information as a first matrix of $m \times n$ pixel component values, where $m$ and $n$ are integers,
   (b) low-pass filtering these pixel component values of the first matrix to produce a second matrix of $m \times n$ pixel component values which describe a reduced resolution image compared with the pixel component values of the first matrix,
   (c) subtracting the second matrix from the first matrix pixel-by-pixel to produce a third matrix of $m \times n$ difference values, which have reduced pixel-to-pixel correlation compared with the pixel component values of the first matrix,
   (d) encoding said third matrix of difference values into a first set of digital data for storage on a storage medium,
   (e) decimation filtering said second matrix of pixel component values to produce a fourth matrix of $m/a \times n/b$ pixel component values of reduced density, where $a$ and $b$ are factors of $m$ and $n$, respectively, and
   (f) forming said fourth matrix of pixel component values into a second set of digital data for storage on a storage medium, and
   (g) recording said first and second sets of digital data on said storage medium in a manner that said first and second sets of digital data are separately and independently readable.

2. A method of decoding digital data obtained by the encoding method as claimed in claim 1, to restitute the original pixel information, comprising the steps of:
   (h) decoding the first set of digital data representing the difference values to reconstitute the third matrix of difference values,
   (i) decoding, if necessary, the second set of digital data representing the pixel component values of reduced density to reconstitute the fourth matrix of pixel component values,
   (j) interpolation filtering said fourth matrix of pixel component values to restitute said second matrix of pixel component values, and
   (k) combining pixel-by-pixel the reconstituted third matrix and the restituted second matrix to restitute said first matrix, the pixel component values of which represent the original pixel information.

3. A decoding method as claimed in claim 2, including the further step (l) of reading the digital data required by steps (h) and (i) from the storage medium.

4. An encoding method as claimed in claim 1 wherein the low-pass filtering of the pixel component values of the first matrix in step (b), and the decimation filtering of the pixel component values of the second matrix in step (e) are both by a factor of two horizontally and vertically.

5. An encoding method as claimed in claim 1 wherein the encoding of the difference values into the first set of digital data, as dealt with by step (d), consists in quantizing these difference values into a smaller number of quantized values, including zero, and encoding the quantized values statistically either by a respective multi-bit code, or as a run-length code for zero difference values.

6. The apparatus of claim 5 wherein said storage medium is an optical record carrier and said means for reading is an associated optical read device.

7. An encoding method as claimed in claim 1 wherein the forming of the fourth matrix in step (f) comprises encoding of the pixel component values of the fourth matrix into the second set of digital data includes delta coding these pixel component values.

8. A method of encoding as claimed in claim 7, wherein information as to the rate of change of pixel information which is produced as a result of the delta coding, is made available in step (d) to enable a range of weighting factor values, as determined by this rate of change pixel information, to be included with the coding of the difference values.

9. A method of encoding as claimed in claim 1 for use with YUV coding, wherein Y is the luminance component of a pixel and U and V are the two chrominance components, wherein these three pixel component values are available as said picture information in respective first matrices and are encoded separately.

10. A method as claimed in claim 9, wherein the first matrix of each of the two chrominance component values has half the horizontal resolution of the first matrix for the luminance component value.

11. A method of encoding as claimed in claim 1 for use with YUV coding, where Y is the luminance component of a pixel and U and V are the two chrominance components, wherein only the luminance component value is said picture information and is encoded, the two chrominance component values being available directly for storage on a storage medium.

12. An encoding arrangement by which pixel information for at least one pixel component value of a plurality of pixels forming an image is encoded into digital data which can be recorded on suitable storage medium comprising:
  means for obtaining said pixel information as a first matrix of $m \times n$ pixel component value, where $m$ and $n$ are integers,
  means for low-pass filtering these pixel component values of the first matrix to produce a second matrix of $m \times n$ pixel component values, which describe a reduced resolution image compared with the pixel component values of the first matrix,
  means for subtracting the second matrix from the first matrix pixel-by-pixel to produce a third matrix of $m \times n$ difference values, which have reduced pixel-to-pixel correlation compared with the pixel component values of the first matrix,
  means for encoding said third matrix of difference values into a first set of digital data,
  means for decimation filtering said second matrix of pixel component values to produce a fourth matrix of $m/a \times n/b$ pixel component values of reduced density, where $a$ and $b$ are factors of $m$ and $n$, respectively,
  means for forming said fourth matrix of pixel component values into a second set of digital data for storage on a storage medium; and
  means for recording said first set and second set of digital data on said storage medium in a manner that said first and second set of digital data are separately and independently readable.

13. An encoding arrangement as claimed in claim 12 including a storage medium on which said first and second sets of digital data are recorded.

14. An encoding arrangement as claimed in claim 13, wherein said storage medium is an optical record carrier and an associated optical read device.

15. An optical record carrier for use in an arrangement as claimed in claim 14, having stored thereon said first and second sets of digital data.

16. An encoding arrangement as claimed in any one of claims 12, 13, 14 and 15, wherein said low-pass filtering means and said decimation filtering means effect filtering by a factor of two both horizontally and vertically.

17. An encoding arrangement as claimed in any one of claims 12, 13, 14 and 15, in which the means for encoding said matrix of difference values quantizes these difference values into a smaller number of quantized values, including zero, and encodes the quantized values statistically either by a respective multi-bit code, or as a run-length code for zero difference values.

18. An encoding arrangement as claimed in any one of claims 12, and 13 to 15, in which the means for encoding the pixel component values of the fourth matrix delta codes these pixel component values.

19. An encoding arrangement as claimed in claim 18, wherein information as to the rate of change of pixel information which is produced by the delta coding means, is made available to said third matrix coding means to enable a range of weighting factor values, as determined by this rate of change pixel information, to be included with the coding of the difference values.

20. An encoding arrangement as claimed in any one of claims 12 and 13 to 15, for use with YUV coding, where Y is the luminance component of a pixel and U and V are the two chrominance components, wherein all these pixel component values are encoded separately starting with respective first matrices.

21. An encoding arrangement as claimed in claim 20, wherein the first matrix of each of the two chrominance component values has half the horizontal resolution of the first matrix for the luminance component value.

22. An encoding arrangement as claimed in any one of claims 12 and 13 to 15, for use with YUV coding, where Y is the luminance component of a pixel and U and V are the two chrominance components, wherein only the luminance component value is said picture information and is encoded, the two chrominance components values being available directly for storage on a storage medium.

23. An arrangement for decoding the digital data obtained by the encoding arrangement of claim 12 to restitute the original pixel information, comprising:
  means for decoding the first set of digital data representing the difference values, as produced by said encoding arrangement, to reconstitute the third matrix of difference values,
  means for decoding, if necessary, the second set of digital data representing the pixel component values of reduced density, as produced by said encoding arrangement, to reconstitute the fourth matrix of pixel component values,
  means for interpolation filtering said fourth matrix of pixel component values to restitute said second matrix of pixel component values, and
  means for combining pixel-by-pixel the reconstituted third matrix and the restituted second matrix to restitute said first matrix, the pixel component values of which represent the original pixel information.

24. A decoding arrangement as claimed in claim 23, including a storage medium on which said first and second sets of digital data are recorded.

25. A decoding arrangement as claimed in claim 24, wherein said storage medium is an optical record carrier and an associated optical read device.

26. A decoding arrangement as claimed in claim 23, 24, 25, for decoding data which is encoded by the encoding arrangement claimed in any one of claims 13 to 15, including complementary decoding means for the filtering, statistical and/or delta encoding employed therein.

27. A decoding arrangement as claimed in claim 26, wherein equivalent rate of change information in the vicinity of each pixel component value being dealt with and produced by said interpolation filtering means is made available in said means for decoding the first set of digital data.

28. An apparatus for displaying an image with m and n pixel component values, from digital image data stored on a storage medium in two distinct separately accessible sets, a first set of data representing component values of said image for a reduced resolution with $m/a \times n/b$ pixels for interpolation filtering to $m \times n$ pixels, and a second set of data representing, component value difference data for the $m \times n$ pixels of said image, applicable to said first set, comprising:

a display memory having a capacity for storing digital component values for an image of $m \times n$ pixels;

a display device, responsive to the display memory for displaying an image from the component values stored in said display memory;

means for independently reading said first and said second sets of image data from said storage medium;

means for interpolation filtering said first set of image data from component values for $m/a \times n/b$ pixels to component values for $m \times n$ pixels;

means for writing said component values for said interpolation filtered first set of image data into said display memory;

means for combining said component values for said interpolation filtered first set of image data and said component value differences from said second set of image data into a set of $m \times n$ pixel component values of combined image data; and means for writing said component values of combined image data into said display memory, in replacement of said component values for said interpolation filtered first set of data.

* * * * *